(12) United States Patent
Harke

(10) Patent No.: US 8,310,193 B2
(45) Date of Patent: Nov. 13, 2012

(54) MINIMUM TEMPERATURE CONTROL FOR ELECTROMECHANICAL ACTUATOR

(75) Inventor: Michael C. Harke, Madison, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 415 days.

(21) Appl. No.: 12/685,827

(22) Filed: Jan. 12, 2010

(65) Prior Publication Data

US 2011/0169439 A1    Jul. 14, 2011

(51) Int. Cl.
G05B 13/00    (2006.01)

(52) U.S. Cl. .................... 318/561; 318/473; 318/400.22

(58) Field of Classification Search .................. 318/561, 318/473, 400.22, 400.1, 400.02, 701, 436
See application file for complete search history.

(56) References Cited

U.S. PATENT DOCUMENTS

| | | |
|---|---|---|
| 3,599,652 A * | 8/1971 | Perkins et al. ..................... 137/2 |
| 4,179,944 A | 12/1979 | Conner |
| 4,355,358 A | 10/1982 | Clelford et al. |
| 5,041,748 A | 8/1991 | Huber |
| 5,770,903 A | 6/1998 | Bland et al. |
| 6,055,120 A | 4/2000 | Schirle |
| 6,078,455 A | 6/2000 | Enarson et al. |
| 6,400,522 B1 | 6/2002 | Milligan |
| 6,735,035 B1 | 5/2004 | Smith et al. |
| 7,248,009 B1 | 7/2007 | Sundquist |
| 2009/0011901 A1 * | 1/2009 | DeMarco ......................... 477/98 |

FOREIGN PATENT DOCUMENTS

JP    2004088939    3/2004

* cited by examiner

*Primary Examiner* — Karen Masih
(74) *Attorney, Agent, or Firm* — Carlson, Gaskey & Olds, PC

(57) ABSTRACT

A component intended for use in very low temperature situations has an electromechanical actuator with a control for an electric motor. The control receives a temperature signal indicative of a temperature being experienced by the electromechanical actuator. The control is operable to produce a current signal sent to the electric motor which will generate heat without significant torque. A method of operating the electromechanical actuator is also disclosed.

16 Claims, 2 Drawing Sheets

MINIMUM TEMPERATURE CONTROL FOR ELECTROMECHANICAL ACTUATOR

BACKGROUND OF THE INVENTION

This application relates to a control for an electromechanical actuator that ensures that the viscosity of an included lubricant will not become too high due to very low temperatures.

Electromechanical actuators are utilized to move any number of components in aircraft. As an example, flaps such as stabilizers, elevators, rudders, etc. are all positioned to precise location by electromechanical actuators. The electromechanical actuators typically include a drive motor, which drives a positioning element to in turn move the position of the aircraft component. A lubricant is typically included in the electromechanical actuator to ensure smooth operation of the actuator.

One challenge with the use of electromechanical actuators, especially in aircraft, is that the electromechanical actuator is exposed to extremely low temperatures. Further, during long cruise segments of a flight, the actuators may be rarely used, such that the actuator approaches those same very low temperatures.

At these very low temperatures, the viscosity of the actuator lubricant is high, resulting in increased friction losses and potentially degraded performance.

Currently, the electromechanical actuators are periodically moved during such long periods of non-use to address this concern.

SUMMARY OF THE INVENTION

A component intended for use in very low temperature situations has an electromechanical actuator with a control for an electric motor. The control receives a temperature signal indicative of a temperature being experienced by the electromechanical actuator. The control is operable to produce a current signal sent to the electric motor which will generate heat without significant torque.

A method of operating the electromechanical actuator is also disclosed.

These and other features of the present invention can be best understood from the following specification and drawings, the following of which is a brief description.

DETAILED DESCRIPTION OF THE PREFERRED EMBODIMENT

Figure 1:
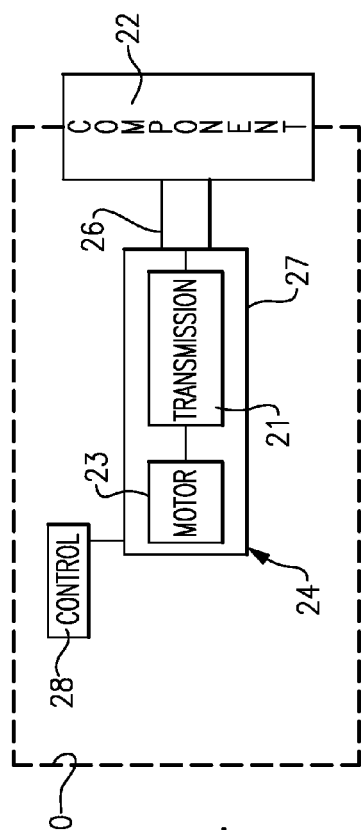
FIG. 1 schematically shows an aircraft.

FIG. 1 schematically shows an aircraft 20 having a component 22 that may be any type of flap, or other component which is moved. A positioning element 26 is driven by an electromechanical actuator 24 to move the positioning element 26. As shown, the electromechanical actuator may include an electric motor 23, along with a rotary to linear gear transmission 21 which moves the element 26. Lubricant is found within the housing 27 of the electromechanical actuator, as known. A control 28 for the electromechanical actuator controls the operation of the motor to achieve precise positioning of the component 22.

Figure 2:
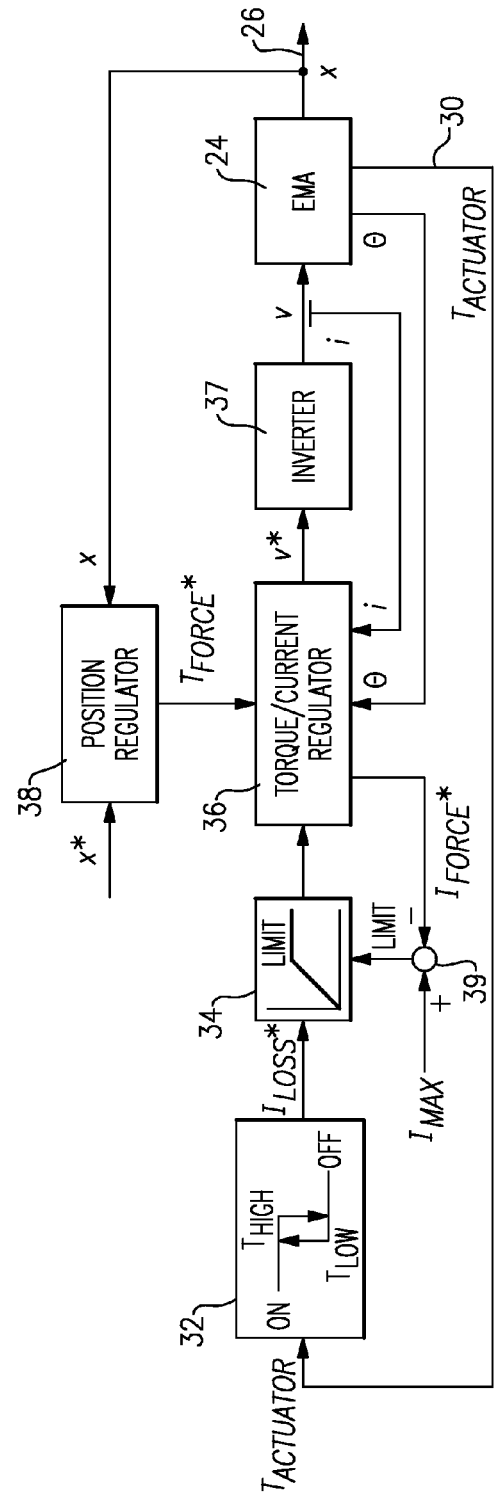
FIG. 2 is a first schematic of a system for addressing low temperatures.

As shown in FIG. 2, a temperature feedback signal 30 extends to a temperature block 32. If the temperature seen at 32 is below a threshold temperature, then the block 32 is turned "on" and a loss current $I_{loss}$ is sent to a controller which sends a current signal to a torque/current regulator 36. The torque/current regulator feeds back a current signal to a summation block 39, along with a max current signal, which provides a limit back to the block 34. Further, an angle signal is sent from the electromechanical actuator 24 to the torque/current regulator, as is a measured current signal.

A position regulator 38 sends a signal to the torque/current regulator, which takes a target position signal x* and an actual position signal x, and determines what command torque $T_{FORCE}$* should be delivered as a signal to the torque/current regulator 36. Based on the commanded torque, motor current i, and motor position θ, the torque/current regulator 36 generates a commanded voltage v* to an inverter 37. In addition, the torque/current regulator can add non-torque producing current as previously described. An inverter 37 provides the power to drive the electromechanical actuator 24 to position the component 22. That is, the torque-current regulator 36 is operable to generally control the electric motor, and position the electric motor as desired, but is also operable to identify and/or generate a signal to be delivered to the inverter 37 that will provide the no-torque load at the electric motor 23.

Notably, the components 38, 32, 34, 36, 37 and 39 are all part of the control 28, as shown in FIG. 1.

However, when the block 32 is "on," then a signal is sent that an additional no-torque output is desired to heat the motor and, subsequently, the actuator. There are a number of ways in which a "no-torque" current can be sent to the inverter 32 to generate heat. The magnitude, frequency and form of the current depends on power quality, EMI requirements, allowable motor flux modulation, and desired level of power loss generated.

One simple way of control is to send current to the motor to maintain a minimum actuator temperature using a hysteresis temperature controller (block 32) as shown in FIG. 2. When the actuator temperature is below the threshold $T_{Low}$ (e.g., 0° centigrade), a heating current is added to the actuator. When the actuator temperature rises above a specified threshold ($T_{High}$, for example 5° centigrade), the heating current is not applied.

One simple method of providing a non-torque current is to provide a signal which is at a very high frequency, and above a frequency at which the motor can produce torque.

Another method, which may be particularly applicable to the use of a permanent magnet motor, is to provide the power signal in phase with permanent magnets. In this manner, the strength of the magnets will simply be increased or decreased, rather than any torque being produced.

Another method, which may be particularly applicable to the use of a switched reluctance motor, is to provide the a fluctuating current through one or more phases of the machine so that the net reluctance torque on the shaft is at or near zero.

Figure 3:
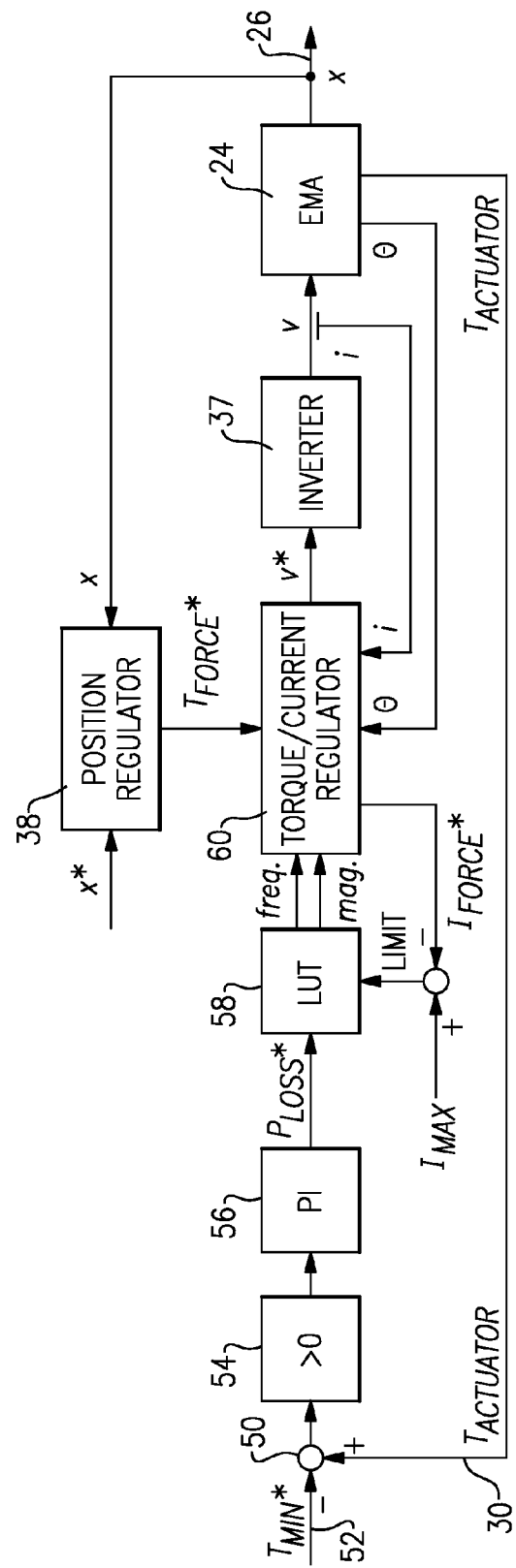
FIG. 3 is an alternative schematic.

FIG. 3 shows another embodiment wherein there may be feedback based upon a temperature error. As an example, the torque current regulator here receives a signal from a summation block 50 which takes in a $T_{Minimum}$ and the $T_{Actual}$, and provides a signal through block 54, should the difference be less than zero. This signal goes into a regulator, for example a proportional+integral (PI) controller 56, and then to a look-up table 58 which determines a frequency and magnitude of a signal to be sent to the torque/current regulator 60. The remainder of the circuit operates generally as in the FIG. 2 circuit.

In sum, if the temperature of an electromechanical actuator is found to be below a threshold temperature, a signal is created and sent to a motor within the electromechanical actuator to produce heat, without significant torque being produced. It should be understood that the term "no-torque" or "without significant torque" are somewhat functional statements, rather than absolute statements. It may be that some limited torque could be produced, however, without any significant movement of the component 22.

With both embodiments, the control can be iterative, and ongoing until the temperature again rises above the threshold ($T_{Low}$ or $T_{Min*}$).

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. An electromechanical actuator intended for use in very low temperature situations comprising:
    a control for an electric motor that is part of an electromechanical actuator, said control receiving a temperature signal indicative of a temperature being experienced by said electromechanical actuator, and said control being operable to produce a current signal sent to said electric motor which will generate heat without torque; and
    a torque/current regulator is part of said control, and receives a signal, and then acts to generate said current signal to be delivered toward said electric motor through an inverter, and said torque/current regulator and said inverter being part of a normal drive circuit for moving said electric motor.

2. The system as set forth in claim 1, wherein said electromechanical actuator drives an aircraft component.

3. An electromechanical actuator intended for use in very low temperature situations comprising:
    a control for an electric motor that is part of an electromechanical actuator, said control receiving a temperature signal indicative of a temperature being experienced by said electromechanical actuator, and said control being operable to produce a current signal sent to said electric motor which will generate heat without torque; and
    said current signal is a high frequency signal.

4. The electromechanical actuator as set forth in claim 3, wherein said high frequency signal is above a frequency at which said electric motor can generate torque.

5. The electromechanical actuator as set forth in claim 3, wherein a torque/current regulator is part of said control, and receives a signal, and then acts to generate said current signal to be delivered toward said electric motor through an inverter, and said torque/current regulator and said inverter being part of a normal drive circuit for moving said electric motor.

6. An electromechanical actuator intended for use in very low temperature situations comprising:
    a control for an electric motor that is part of an electromechanical actuator, said control receiving a temperature signal indicative of a temperature being experienced by said electromechanical actuator, and said control being operable to produce a current signal sent to said electric motor which will generate heat without torque; and
    said electric motor is a permanent magnet motor, and said signal is selected to be of a phase such that no torque will be generated by said electric motor.

7. An electromechanical actuator intended for use in very low temperature situations comprising:
    a control for an electric motor that is part of an electromechanical actuator, said control receiving a temperature signal indicative of a temperature being experienced by said electromechanical actuator, and said control being operable to produce a current signal sent to said electric motor which will generate heat without torque; and
    said electric motor is a switched reluctance motor, and said signal is selected to be of a phase such that no torque will be generated by said electric motor.

8. The electromechanical actuator as set forth in claim 7, wherein temperature feedback and a proportional integral controller are utilized to adjust said signal to have said temperature of said electromechanical actuator moved back above said threshold.

9. An electromechanical actuator intended for use in very low temperature situations comprising:
    a control for an electric motor that is part of an electromechanical actuator, said control receiving a temperature signal indicative of a temperature being experienced by said electromechanical actuator, and said control being operable to produce a current signal sent to said electric motor which will generate heat without torque; and
    said temperature signal is compared to a predetermined low threshold, and said current signal is generated should said temperature signal be below said threshold.

10. An electromechanical actuator intended for use in very low temperature situations comprising:
    a control for an electric motor that is part of an electromechanical actuator, said control receiving a temperature signal indicative of a temperature being experienced by said electromechanical actuator, and said control being operable to produce a current signal sent to said electric motor which will generate heat without torque; and
    a look-up table is utilized in combination with said proportional integral controller to identify the current signal to be sent to said electric motor.

11. A method of operating an electromechanical actuator to drive a component comprising:
    a) sensing a temperature being experienced by an electromechanical actuator;
    b) comparing said sensed temperature to a low threshold temperature;
    c) producing a current signal and sending said current signal to an electric motor to generate heat without torque should said sensed temperature be below said threshold; and
    d) utilizing a look-up table in combination with a proportional integral controller to identify the current signal.

12. A method of operating an electromechanical actuator to drive a component comprising:
    a) sensing a temperature being experienced by an electromechanical actuator;
    b) comparing said sensed temperature to a low threshold temperature;
    c) producing a current signal and sending said current signal to an electric motor to generate heat without torque should said sensed temperature be below said threshold; and
    d) the current signal being a high frequency sinusoidal signal.

13. The method as set forth in claim 12, wherein said high frequency signal is above a frequency at which said electric motor can generate torque.

14. The method as set forth in claim 12, wherein said electric motor is a switched reluctance motor, and said signal is of a phase such that no torque is generated by said electric motor.

15. A method of operating an electromechanical actuator to drive a component comprising:
   a) sensing a temperature being experienced by an electromechanical actuator;
   b) comparing said sensed temperature to a low threshold temperature;
   c) producing a current signal and sending said current signal to an electric motor to generate heat without significant torque should said sensed temperature be below said threshold; and
   d) the electric motor is a permanent magnet motor, and said signal is of a phase such that no torque is generated by said electric motor.

16. A method of operating an electromechanical actuator to drive a component comprising:
   a) sensing a temperature being experienced by an electromechanical actuator;
   b) comparing said sensed temperature to a low threshold temperature;
   c) producing a current signal and sending said current signal to an electric motor to generate heat without torque should said sensed temperature be below said threshold; and
   d) utilizing temperature feedback to adjust said signal once said temperature experienced by said actuator is moved back above said threshold.

* * * * *